(12) United States Patent
Endo (10) Patent No.: US 7,813,631 B2
(45) Date of Patent: Oct. 12, 2010

(54) IMAGE-TAKING APPARATUS (75) Inventor: Hiroshi Endo, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 523 days.

(21) Appl. No.: 11/833,294

(22) Filed: Aug. 3, 2007

(65) Prior Publication Data
US 2008/0080851 A1    Apr. 3, 2008

(30) Foreign Application Priority Data
Sep. 29, 2006 (JP) .............................. 2006-268019

(51) Int. Cl.
*G03B 15/03* (2006.01)
(52) U.S. Cl. .................... 396/61; 396/155; 348/371; 362/13
(58) Field of Classification Search ............ 396/61, 396/155; 348/371; 362/13
See application file for complete search history.

(56) References Cited

U.S. PATENT DOCUMENTS

| | | | | |
|---|---|---|---|---|
| 4,322,141 A | * | 3/1982 | Tominaga et al. ......... | 396/106 |
| 5,357,297 A | * | 10/1994 | Jeong et al. .............. | 396/61 |
| 5,528,333 A | * | 6/1996 | Lee ....................... | 396/165 |
| 6,011,547 A | * | 1/2000 | Shiota et al. ............. | 382/254 |
| 6,154,612 A | * | 11/2000 | Iwasaki .................. | 396/61 |
| 2005/0243175 A1 | * | 11/2005 | Yamada et al. ........... | 348/207.1 |
| 2006/0083507 A1 | * | 4/2006 | Endo ..................... | 396/155 |

FOREIGN PATENT DOCUMENTS

| | | |
|---|---|---|
| JP | 2003-179808 A | 6/2003 |
| JP | 22005-210723 A | 8/2005 |
| JP | 2005-301217 A | 10/2005 |
| JP | 2006-119264 A | 5/2006 |

* cited by examiner

*Primary Examiner*—Christopher E Mahoney
*Assistant Examiner*—Fang-Chi Chang
(74) *Attorney, Agent, or Firm*—Sughrue Mion, PLLC (57) ABSTRACT

In an image-taking apparatus, a main CPU reads a sensitivity level that has been set, thereby determining whether a subject distance measured in AF processing is longer as compared to a threshold. The threshold is variable such that the higher the sensitivity level is the longer the threshold is. When the main CPU determines that the subject distance is longer as compared to the threshold, a metering/distance-measuring CPU causes a first light emitter having a xenon tube to emit light in response to an instruction from the main CPU. When the main CPU determines that the subject distance is shorter as compared to the threshold, the metering/distance-measuring CPU causes a second light emitter having an LED to emit light in response to an instruction from the main CPU.

11 Claims, 10 Drawing Sheets

FIG. 6(a) Xenon tube

FIG. 6(b) LED

IMAGE-TAKING APPARATUS

BACKGROUND OF THE INVENTION

1. Field of the Invention

The present invention relates to an image-taking apparatus that includes an imaging device and forms a subject image on the imaging device thereby generating image signals.

2. Description of the Related Art

Conventionally, image-taking apparatus have been generally provided with a light-emitting means that emits fill light when the brightness of field is low. Many of the light-emitting means include, as a light source, a xenon tube whose emission spectrum is close to sunlight. However, since use of the xenon tube leads to increase in power consumption and size, in some of the latest mobile telephones with a camera, a low-power LED is employed as a light source for shooting with fill light, instead of the xenon tube (for example, see Japanese Patent Laid-Open No. 2003-179808).

Meanwhile, some of recent digital cameras are equipped with, as light sources, both a xenon tube that emits a relatively large amount of fill light for shooting and an LED that emits a relatively small amount of fill light for shooting as disclosed in, for example, Japanese Patent Laid-Open Nos. 2006-119264, 2005-210723 and 2005-301217. According to the techniques disclosed in these documents, a small amount of fill light is emitted from an LED when a subject distance is shorter as compared to a predetermined distance, and a large amount of fill light is emitted from a xenon tube when a subject distance is longer as compared to the predetermined distance.

Some of the digital cameras are equipped with a sensitivity setting section capable of setting any desired level of sensitivity. In this type of digital camera, the higher the set sensitivity is, the smaller the amount of fill light for shooting is.

However, if any of the techniques disclosed in Japanese Patent Laid-Open Nos. 2006-119264, 2005-210723 and 2005-301217 is employed in the digital camera provided with the sensitivity setting section, the amount of reflected light becomes larger than expected at certain levels of sensitivity. In this case, image signals output from some of multiple light-receiving elements forming an imaging device are saturated during signal processing, thereby causing the so-called "white out" phenomenon. Occurrence of the white out phenomenon results in a shot image with white dots.

SUMMARY OF THE INVENTION

The present invention has been made in view of the above circumstances, and provides an image-taking apparatus in which sensitivity for shooting can be freely set and which is capable of emitting an appropriate amount of fill light for shooting according to the set sensitivity.

An image-taking apparatus according to the present invention is an apparatus having an imaging device and an image-taking optical system and generates image signals by forming an image of a subject on the imaging device through the image-taking optical system, the apparatus including:

a light emitting section including a first light emitter that emits a relatively large amount of light for shooting and a second light emitter that emits a relatively small amount of light for shooting;

a metering section that meters brightness of field;

a sensitivity setting section that sets a sensitivity level;

a distance measuring section that measures a subject distance; and an emission control section that, in a case where the brightness metered by the metering section is equal to or lower than a predetermined level, causes the first light emitter to emit light when the subject distance measured by the distance measuring section is longer as compared to a threshold, and causes the second light emitter to emit light when the subject distance measured by the distance measuring section is shorter as compared to the threshold, the threshold being determined according to the sensitivity level set by the sensitivity setting section and being variable such that the higher the sensitivity level is the longer the threshold is.

In the image-taking apparatus, the light emitting section causes the first light emitter to emit light when the subject distance measured by the distance measuring section is longer as compared to the threshold and causes the second light emitter to emit light when the subject distance measured by the distance measuring section is shorter as compared to the threshold. The threshold is determined according to the sensitivity level set by the sensitivity setting section, and is variable such that the higher the sensitivity level is the longer the threshold is.

The image-taking apparatus thus configured can effectively use either the first light emitter or the second light emitter based on not only the subject distance but also the sensitivity. Therefore, an appropriate amount of light can be emitted for any types of shooting.

In the image-taking apparatus according to the present invention, the emission control section may include:

a sensor that measures an amount of light reflected from the subject, the reflected light originating from the light emitted from the light emitting section to the subject; and a light-emission terminator that terminates emission of the light emitted from the light emitting section based on the amount of light measured by the sensor.

Also, in the image-taking apparatus according to the present invention, the emission control section may cause the light emitting section to release a pre-emission, and the emission control section may include:

a calculator that calculates an amount of light to be emitted as a main emission, based on image signals obtained by the imaging device at the pre-emission; and a light adjuster that adjusts light by adjusting a duration of the main emission performed by the light emitting section based on the amount of light calculated by the calculator.

When the emission control section is thus configured, an amount of light to be emitted is precisely adjusted based on the amount of light measured by the sensor or based on the amount of light for a main emission calculated based on a pre-emission.

The image-taking apparatus according to the present invention may further include a white-balance adjustment section that adjusts a white balance of image signals obtained by the imaging device, such that the white-balance adjustment section makes a white-balance adjustment differently to image signals obtained by shooting with light, depending on which of the first light emitter and the second light emitter the light has been emitted from.

When the image-taking apparatus is thus configured, image signals obtained based on light emitted from the first light emitter are subjected to a white-balance adjustment according to an emission spectrum of the light source of the first light emitter, whereas those obtained based on light emitted from the second light emitter are subjected to a white-balance adjustment according to an emission spectrum of the light source of the second light emitter. Accordingly, whichever light emitter is used, an appropriate white-balance adjustment is performed so that a clear-color image can be obtained.

In the image-taking apparatus according to the present invention, the first light emitter may include a xenon tube and the second light emitter comprises an LED.

Also, the image-taking apparatus according to the present invention may further include a notification section that notifies a user of which one of the first light emitter and the second light emitter has been used in shooting.

This additional feature makes it possible for a user to know which light source has been used in shooting. For example, If a user found that the glare of a light emission was not dazzling during shooting after taking a self-portrait, the user would become aware that a light source that has just been used is suitable for shooting a self-portrait and that it will be easy for the user to keep a good face expression when taking another self-portrait.

The image-taking apparatus according to the present invention may further include a recording section that records which one of the first light emitter and the second light emitter has been used in shooting, in association with image signals obtained by the shooting.

This additional feature makes it possible for a user to know what type of light source has been used for shooting, by looking at an image reproduced by a personal computer or the like and displayed on the display screen based on image signals which are obtained by the shooting and recorded in the recording section.

In the image-taking apparatus according to the present invention, the metering section may perform metering based on image signals obtained by the imaging device.

Further, in the image-taking apparatus according to the present invention, the distance measuring section may perform measurement based on image signals obtained by the imaging device.

Furthermore, the image-taking apparatus according to the present invention may further include a display section having a display screen, in which the notification section notifies a user of a light emitter that has been used in shooting by displaying the light emitter on the display screen of the display section.

As described above, according to the invention, there is realized an image-taking apparatus in which sensitivity for shooting can be freely set, and which is capable of emitting an appropriate amount of fill light for shooting according to the set sensitivity.

DETAILED DESCRIPTION OF THE INVENTION

Embodiments of the present invention will be described with reference to the drawings.

FIGS. 1(a) and 1(b) each show a digital camera 100 according to a first embodiment of the present invention. FIGS. 1(a) and 1(b) show the front and back of the digital camera 100 according to the first embodiment, as viewed obliquely from above, respectively.

Figure 1:
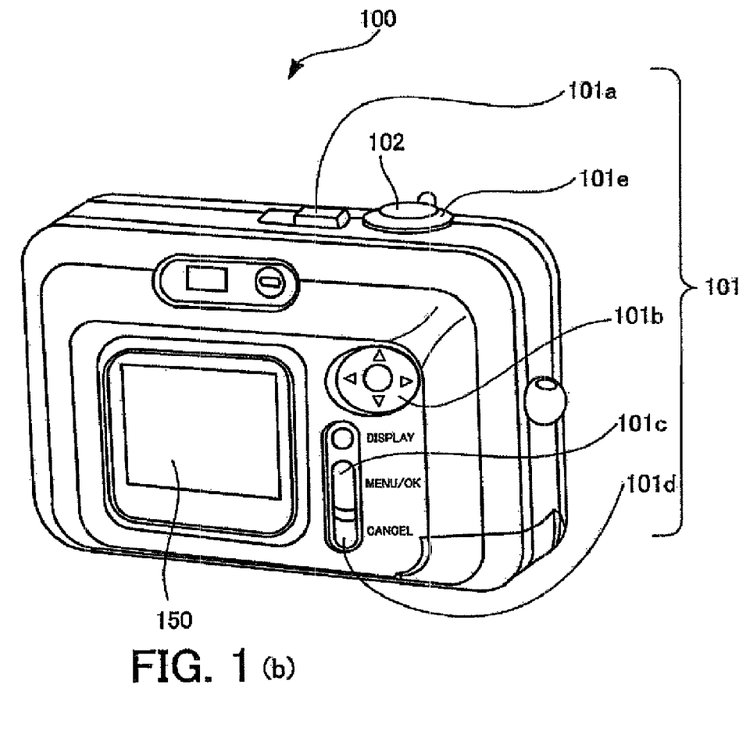
FIGS. 1(a) and 1(b) are diagrams each showing a digital camera according to a first embodiment of the present invention.

As shown in FIG. 1 (a), provided at the center of the digital camera 100 is a lens barrel 170 above which a light emission windows 160 and 180 are disposed side by side.

As shown in FIG. 1(b), disposed on the back and top of the digital camera 100 is an operating switch group 101 for allowing a user to perform various operations when using the digital camera 100.

The operating switch group 101 includes a power switch 101a, a cross key 01b, a Menu/OK button 101c, a cancel button 101d, a mode lever 101e and the like. The mode lever 101e is used to switch between a playback mode and a shooting mode and to switch between a moving-image mode and a still-image mode in the shooting mode. When the shooting mode is selected by the mode lever 101e, a through image (live view) is displayed on an LCD panel 150, and a user can take an image of a subject by pressing a release button 102 disposed on the top of the digital camera 100 while looking at the through image. When the playback mode is selected by the mode lever 101e, an image obtained by shooting is displayed on the LCD panel 150.

The LCD panel 150 also displays a selection menu in response to a press of the menu/OK button 101c. The menu to be displayed on the LCD panel 150 includes an item indicating sensitivity for shooting. When the item indicating sensitivity for shooting is selected and further, any of sensitivity levels in this item is selected through the cross key 101b, the selected sensitivity level is set in a main CPU, which will be described later, disposed inside the digital camera 100.

The release button 102 of the digital camera 100 has two operation stages: half-press and full-press. Upon a half-press of the release button 102, TTL metering and TTL distance measurement are both performed in the digital camera 100, an aperture and a shutter speed (sec.) corresponding to a photometric value are set, and a focus lens is arranged at a focus position based on the result of the distance measurement. Subsequently, upon a full-press of the release button 102, a shutter is driven at the set speed, and exposure is performed by a CCD solid-state imaging device (hereinafter simply referred to as "CCD").

The digital camera 100 of the present embodiment has two shutters: a mechanical shutter, and an electronic shutter provided in the CCD. The mechanical shutter is used when the shutter speed is low, and the electronic shutter is used when the shutter speed is too high to drive the mechanical shutter. However, for shooting a still-image, the mechanical shutter is preferably used to prevent occurrence of a smear that is very likely to occur in the still-image shooting. Meanwhile, for shooting a moving image while displaying a through-image (live view), the electronic shutter is mainly used although the mechanical shutter may also be used.

Now, an internal configuration and operation of the digital camera 100 will be briefly described with reference to FIG. 2.

Figure 2:
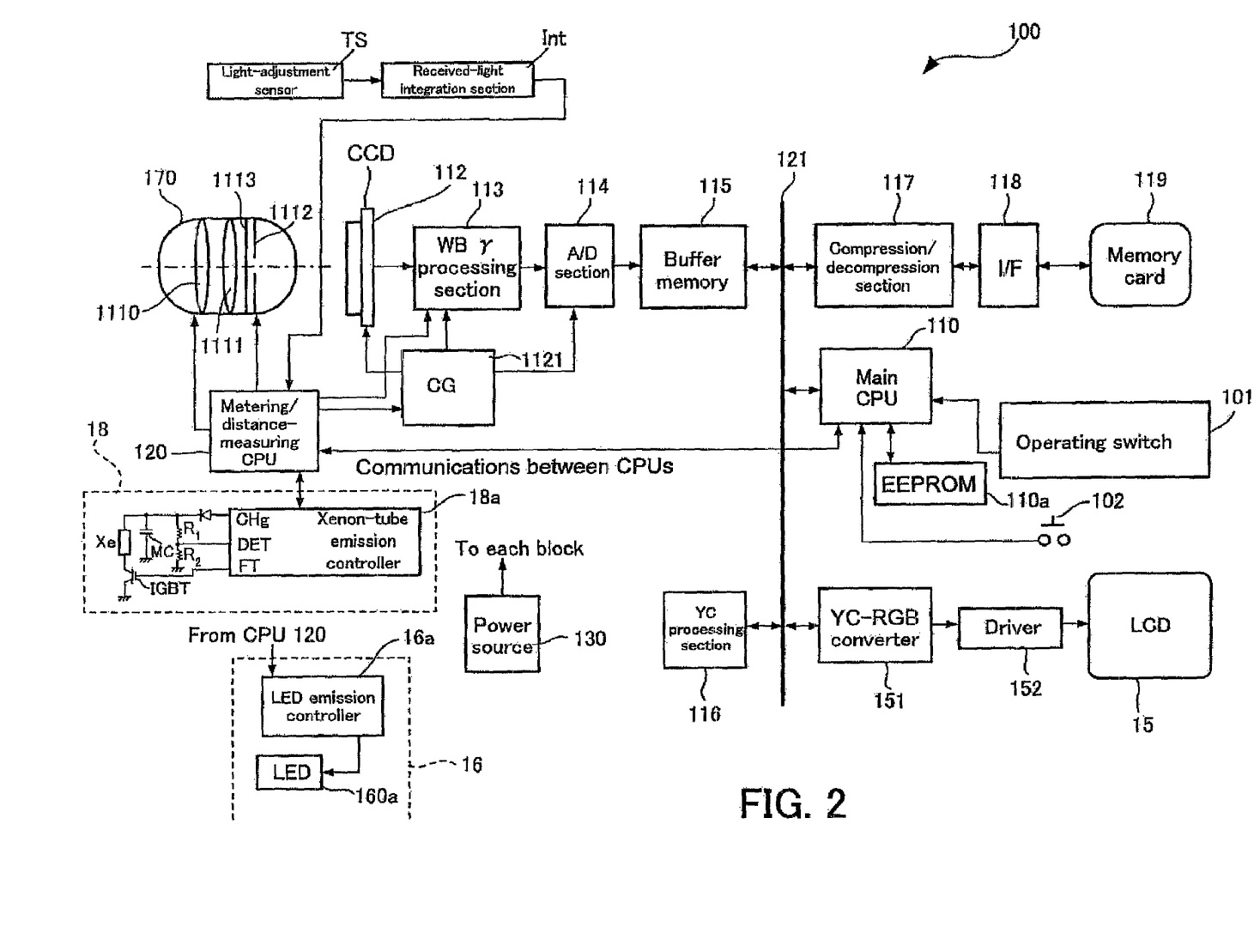
FIG. 2 is a block diagram illustrating an electric system configured inside the digital camera shown in FIGS. 1(a) and 1(b)

FIG. 2 is a block diagram illustrating an electric system configured inside the digital camera 100 shown in FIGS. 1(a) and 1(b).

The digital camera 100 of the present embodiment includes a main CPU 110 that controls all processing in the digital camera 100. Shooting processing such as metering, distance measurement and exposure is executed by the main CPU 110 in cooperation with a metering/distance-measuring CPU 120. Disposed inside the lens barrel 170 shown in FIG. 1(a) is a shooting optical system including: a shooting lens group composed of a focus lens 1111 used to adjust the focus and a lens 1110 having other function; a diaphragm 1112; and a mechanical shutter 1113. Based on instructions from the main CPU 110, the metering/distance-measuring CPU 120 controls driving of the focus lens 1111 to move it in a direction along the optical axis, adjusts the aperture of the diaphragm 1112, and controls opening and closing of the mechanical shutter 1113. In the present embodiment, a first light emitter 18 and a second light emitter 16 are provided. Fill light for shooting emitted from these light emitters a real so controlled by the metering/distance-measuring CPU 120 based on instructions from the main CPU 110, via a Xenon-tube emission controller 18a and an LED emission controller 16a. Further, in the present embodiment, a light-adjustment sensor TS is provided to detect the amount of light per unit time, which is reflected and returned from a subject after light is emitted to the subject. The detected amounts of light per unit time are then accumulated by a received-light integration section Int, and when the accumulated amount of light reaches a predetermined level, the light emission is stopped. When the light-adjustment sensor is provided, the amount of light to be emitted at the time of shooting is precisely adjusted, which reduces the rate of occurrence of "white out" phenomenon frequently seen in conventional techniques as mentioned above. As will be described later more in detail, a combination of the main CPU 110 and the metering/distance-measuring CPU 120 is an example of the emission control section according to the invention.

With reference to FIG. 2, the internal configuration of the digital camera 100 and the operation of each section will be described.

First, a configuration around the main CPU 110 will be described.

Signals from the operating switch group 101 shown in FIG. 1(b) are supplied to an input section of the main CPU 110. Upon receipt of any of these signals, the main CPU 110 appropriately performs processing according to the received signal. The main CPU 110 includes an EEPROM 110a that stores a program necessary for the operation of the digital camera 100. Upon turning on of the power switch 101a (see FIGS. 1(a) and 1(b)) of the digital camera 100, the main CPU 110 starts controlling the operation of the entire digital camera 100 according to procedures described in the program stored in the EEPROM 110a. The main CPU 110 and the metering/distance-measuring CPU 120 are constantly supplied with power from a power source 130.

Now, with reference to FIG. 2, there will be described how the digital camera 100 operates after the power switch 101a of the operating switch group 101 (see FIGS. 1(a) and 1(b)) is turned on.

Upon turning on of the power switch 101a of the operating switch group 101, the main CPU 110 detects the turning on of the power switch 101a and the power source 130 starts supplying power to blocks such as the metering/distance-measuring CPU 120. If the shooting mode is selected by the mode lever 101e at the time of turning on of the power switch 101a, image signals representing a subject image formed on a CCD 112 are thinned out and output at predetermined intervals so that the subject image represented by the output image signals is displayed on the LCD panel 150 of an image display LCD 15.

The CCD 112 is supplied with timing signals from a clock generator (CG) 1121. Image signals are thinned out and output at predetermined intervals according to the timing signals. In other words, the electronic shutter of the CCD 112 is driven by the CG 1121 so that shooting for creating a through image is performed at predetermined intervals. The CG 1121 outputs timing signals based on instructions from the main CPU 110. The timing signals are also sent to, in addition to the CCD 112, a white-balance (WB) γ processing section 113 and an A/D section 114 which are provided in subsequent stages. Accordingly, in synchronization with the timing signals, image signals are sequentially processed in the CCD 112, the WB γ processing section 113 and the A/D section 114. The WB γ processing section 113 of the digital camera 100 in the present embodiment has a built-in variable-gain amplifier whose gain can freely change according to an external control signal. Therefore, when a sensitivity level is set by the user in the manner described above with reference to FIGS. 1(a) and 1(b), the set level is written in a register of the main CPU 110 and notified to the metering/distance-measuring CPU 120 which then sets a gain in the gain amplifier according to the sensitivity level, thereby adjusting the sensitivity.

The image signals are thus smoothly processed by the CCD 112, the WB γ processing section 113 and the A/D section 114 in synchronization with the timing signals from the CG 1121, and then supplied from the A/D section 114 to a YC processing section 116. After undergoing white-balance adjustment, γ processing, and sensitivity adjustment, the image signals are then subjected to analog-digital conversion by the A/D section 114 and subsequently sent to the YC processing section 116. When the image signals are sent from the A/D section 114 to the YC processing section 116, processing timing of the A/D section 114 and that of the YC processing section 116 need to be matched with each other. For this reason, a buffer memory 115 is provided between the A/D section 114 and the YC processing section 116 in order to make an adjustment in the processing timing between these sections. The signals received by the YC processing section 116 are RGB signals, which are then converted into YC signals in the YC processing section 116. Subsequently, from the YC processing section 116, YC signals are supplied to the LCD 15 and Y signals are supplied to the main CPU 110 via the bus 121.

Before the LCD 15, a YC-RGB converter 151 for converting YC signals into RGB signals is provided. The YC signals sent toward the LCD 15 are first received by the YC-RGB converter 151 where the received signals are converted back to RGB signals. The RGB signals thus obtained are then sent to a driver 152 that causes the LCD 15 to display an image of a subject on the LCD panel 150 based on the received RGB signals.

In the main CPU 110 to which Y signals are supplied, metering is performed based on the Y signals, and a photometric value obtained by the metering is sent to the metering/distance-measuring CPU 120. The metering/distance-measuring CPU 120 constantly adjusts exposure required for obtaining a through image of appropriate brightness, by changing and setting the aperture as well as setting the shutter speed of the electronic shutter of the CCD 112. Meanwhile, the main CPU 110 constantly adjusts the focus by detecting contrast based on the Y signals, thereby obtaining a focus position. The obtained focus position is then sent from the main CPU 110 to the metering/distance-measuring CPU 120 that in turn places the focus lens 1111 at the focus position.

In this way, in synchronization with the timing signals from the CG 1121, the CCD 112, the WB γ processing section 113, the A/D section 114, the buffer memory 115 and the like operate and process image signals generated by the CCD 112 at predetermined intervals. Accordingly, an image of a subject to which the shooting lens is directed is constantly displayed on the LCD panel 150 of the LCD 15. The user can take an image of the subject by pressing the release button 102 while looking at the displayed subject image. In response to the press of the release button 102, the mechanical shutter 1113 is driven under the control of the metering/distance-measuring CPU 120, such that the mechanical shutter 1113 is opened to allow subject light to be formed on the CCD 112 and closed after a lapse of predetermined time based on the shutter speed. Then, image signals based on the subject light formed on the CCD 112 are all output as RGB signals.

The digital camera 100 of the present embodiment shown in FIG. 2 includes two light emitters: the first light emitter 18 and the second light emitter 16. When brightness of field is low, either one of these light emitters is used to emit light in response to the press of the release button 102, according to both subject distance and sensitivity for shooting. The first light emitter 18 has a xenon tube Xe and the second light emitter 16 has an LED 160*a*.

Meanwhile, the CCD 112 is provided with arrayed multiple light-receiving elements that two-dimensionally sample subject light to generate an image. In addition, when a level of sensitivity for shooting is set by the user as described above with reference to FIGS. 1(*a*) and 1(*b*), the gain of the amplifier in the WB γ processing section 113 provided subsequent to the CCD 112 shown in FIG. 2 is adjusted so as to amplify image signals representing subject light received by the light-receiving elements, so that the sensitivity for shooting is adjusted.

If a conventional technique is employed here, a predetermined length of subject distance is used as a threshold, and light is emitted from the LED 160*a* of the second light emitter 16 when subject distance is shorter as compared to the threshold, whereas light is emitted from the xenon tube Xe of the first light emitter 18 when subject distance is longer as compared to the threshold, irrespective of the level of sensitivity for shooting. In this case, when the sensitivity is high, image signals are amplified by the variable-gain amplifier to an undesirably large extent, some of the image signals output from the multiple light-receiving elements reach a level of saturation. Especially, when light is emitted from the xenon tube Xe for a subject distance near the threshold, the amount of reflected light becomes large and thus, image signals output from some of the light-receiving elements reach a level of saturation, which is very likely to result in a white-out phenomenon.

In view of the above problem, the main CPU 110 of the present embodiment compares a threshold (distance), which is variable such that the higher the sensitivity level set by a user is the longer the threshold is, with a subject distance measured by the function of measuring a distance. Based on the comparison, the main CPU 110 selects either the first light emitter 18 or the second light emitter 16; whichever emits a more appropriate amount of light. The main CPU 110 then notifies the metering/distance-measuring CPU 120 of the result of the selection, so that the metering/distance-measuring CPU 120 causes the selected light emitter to emit light. Further, in order to precisely adjust the amount of emitted light, the present embodiment is configured such that the amount of emitted light is measured per unit time by the light-adjustment sensor TS and integrated by the received-light integration section Int, and light emission is stopped when the amount of emitted light per unit time reaches a predetermined level.

Returning back to the description of the operation of the digital camera 100 after the turning on of the power switch 101*a*, there will be described how the digital camera 100 operates after the mechanical shutter 1113 is closed. After the mechanical shutter 1113 is closed, RGB signals output from the CCD 112 are subjected to a white-balance adjustment and γ processing by the WB γ processing section 113 and then, converted into digital signals by the A/D section 114. The digital image signals thus obtained are supplied to the YC processing section 116 via the bus 121 under the control of the main CPU 110, and converted into YC signals in the YC processing section 116. The YC signals thus obtained are supplied to the compression/decompression section 117 via the bus 121 where the YC image signals are compressed. The compressed image signals are then recorded in a memory card 119 via an I/F 118 as an image file together with its header. The compression/decompression section 117 compresses still-image data in accordance with a JPEG-compliant compression method. Written in the header of the image file stored in the memory card 119 are compression information, shooting information and the like. Upon selection of the playback mode by the mode lever 101*e*, first, the header of the image file is read out from the memory card 119. Subsequently, the compressed image signals in the file are decompressed by the compression/decompression section 117 based on the compression information written in the header, so as to be restored to the original image signals. The decompressed image signals are then supplied to the LCD 15 via the bus 121 under the control of the main CPU 110, so that an image based on the image signals is displayed on the LCD panel 150.

Now, there will be described how the amount of light emitted from the xenon tube Xe of the first light emitter 18 is different from that emitted from the LED 160*a* of the second light emitter 16.

Figure 3A:
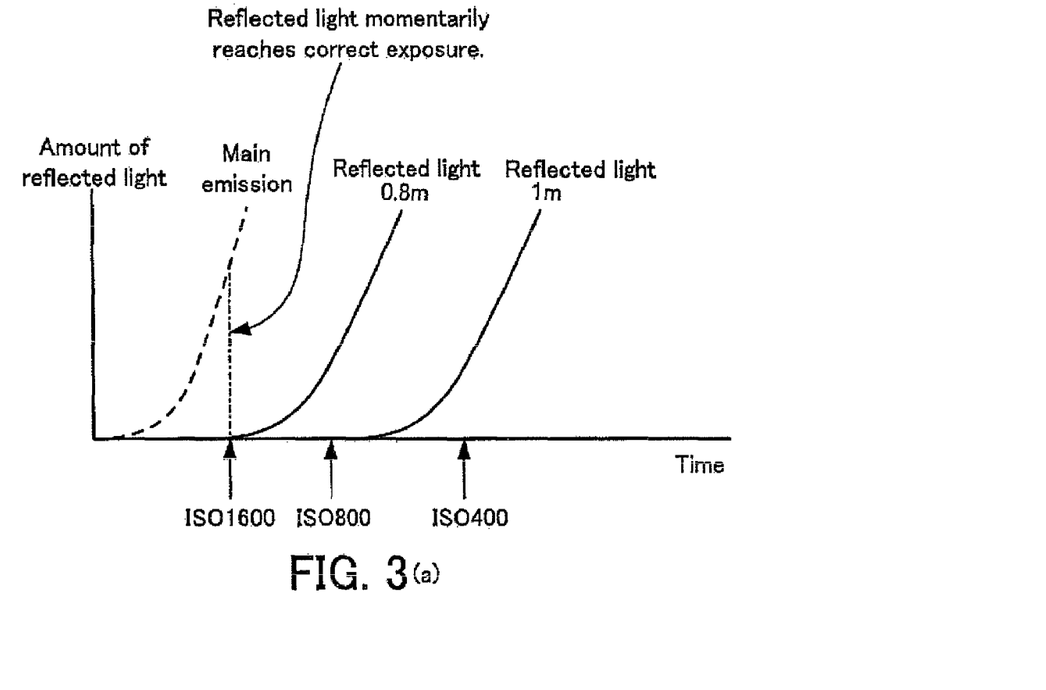
FIGS. 3(a) and 3(b) illustrate the difference between the amount of light emitted from a xenon tube and that emitted from an LED.
Figure 3B:
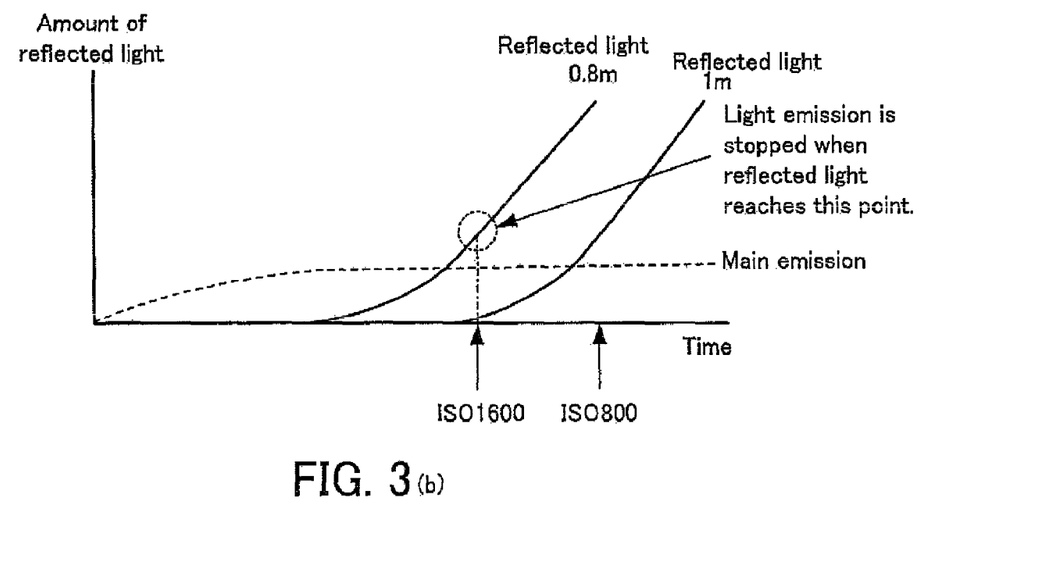

FIGS. 3(*a*) and 3(*b*) illustrate the difference between timing for closing the shutter according to the level of sensitivity when light is emitted from the xenon tube Xe and that when light is emitted from the LED 160*a*.

FIG. 3(*a*) show show the timing for stopping light emission from the xenon tube Xe changes according to the level of sensitivity for shooting, and FIG. 3(*b*) shows how the timing for stopping light emission from the LED 160*a* changes according to the level of sensitivity for shooting. The vertical axis of FIGS. 3(*a*) and 3(*b*) shows the amount of light reflected and returned from a subject after light is emitted, and the horizontal axis of FIGS. 3(*a*) and 3(*b*) shows the time elapsed from start of light emission. Incidentally, a dotted line shown in FIG. 3(*a*) represents a main emission, indicating the timing for emitting light from the xenon tube Xe and the state of the light emission in the main emission.

FIG. 3(*a*) illustrates, for example, a case where when light is emitted from the xenon tube Xe so as to shoot an image of a subject 0.8 m away with the sensitivity level of ISO 1600, some of multiple light-receiving elements of the CCD 112 are saturated if the mechanical shutter 1113 is not closed before light reflected from the subject is received by the CCD 112.

In other words, when the sensitivity is high, the xenon tube Xe cannot be used for taking an image of a subject in a close range, because a large amount of light is reflected from the subject and the amount of reflected light momentarily surpasses an appropriate level.

In contrast, when the LED 160a is used instead under the same conditions, the amount of emitted light is small as shown in FIG. 3(*b*). In this case, even if an image of a subject 0.8 m away is shot with fill light, it takes a longer time for the amount of reflected light to reach a predetermined level and thus, shooting is desirably performed.

If a subject distance of 0.8 m is set as a threshold for determining which one of the LED 160a and the xenon tube Xe is to be used as in a conventional manner, shooting with light emission from the xenon tube Xe can be performed without problems when the sensitivity is ISO800. However, shooting with light emission from the xenon tube Xe causes a problem when the sensitivity is ISO1600. Specifically, in the latter case, the amount of reflected light becomes large and thus, image signals output from the light-receiving elements of the CCD 112 reach a level of saturation during signal processing.

In view of the circumstances, instead of using a conventional fixed threshold for determining which one of the LED 160a and the xenon tube Xe is to be used, the present embodiment employs a threshold (distance) which is variable such that the higher the sensitivity is the longer the threshold is. In the present embodiment, the threshold is compared with a subject distance, and when the subject distance is shorter as compared to the threshold, light is emitted from the LED 160a, whereas when the subject distance is longer as compared to the threshold, light is emitted from the xenon tube Xe.

For example, when the sensitivity is ISO800, the main CPU 110 and metering/distance-measuring CPU 120 use a threshold of 1 m. In this case, the main CPU 110 and metering/distance-measuring CPU 120 cause the second light emitter 16 to emit light when the subject distance is shorter as compared to 1 m, and cause the first light emitter 18 to emit light when the subject distance is longer as compared to 1 m. When the sensitivity is ISO1600, the main CPU 110 and metering/distance-measuring CPU 120 use a threshold of 2 m, and cause the second light emitter 16 to emit light when the subject distance is shorter as compared to 2 m, while causing the first light emitter 18 to emit light when the subject distance is longer as compared to 2 m.

Figure 4A:
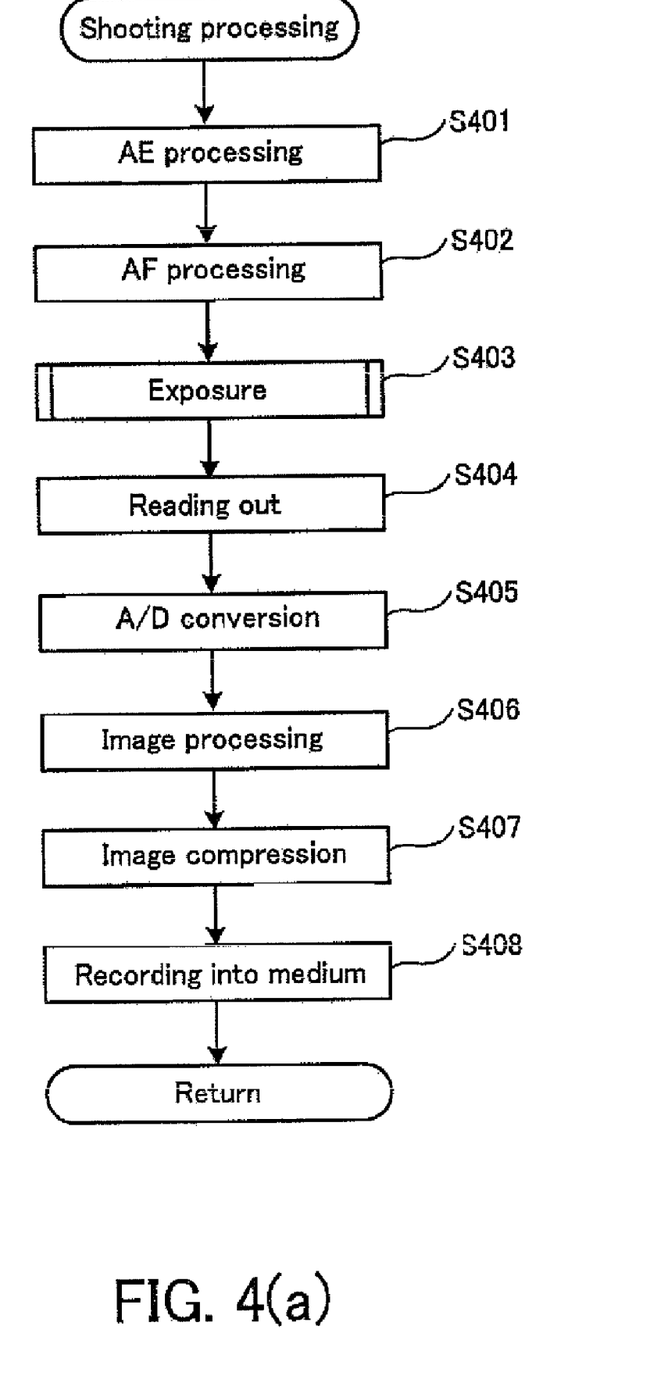
FIGS. 4(a) and 4(b) are flowcharts showing a shooting processing procedure performed by a main CPU and a metering/distance-measuring CPU which form an example of the emission control section according to the invention, and showing the details of exposure processing performed at step S403 shown in FIG. 4(a), respectively.
Figure 4B:
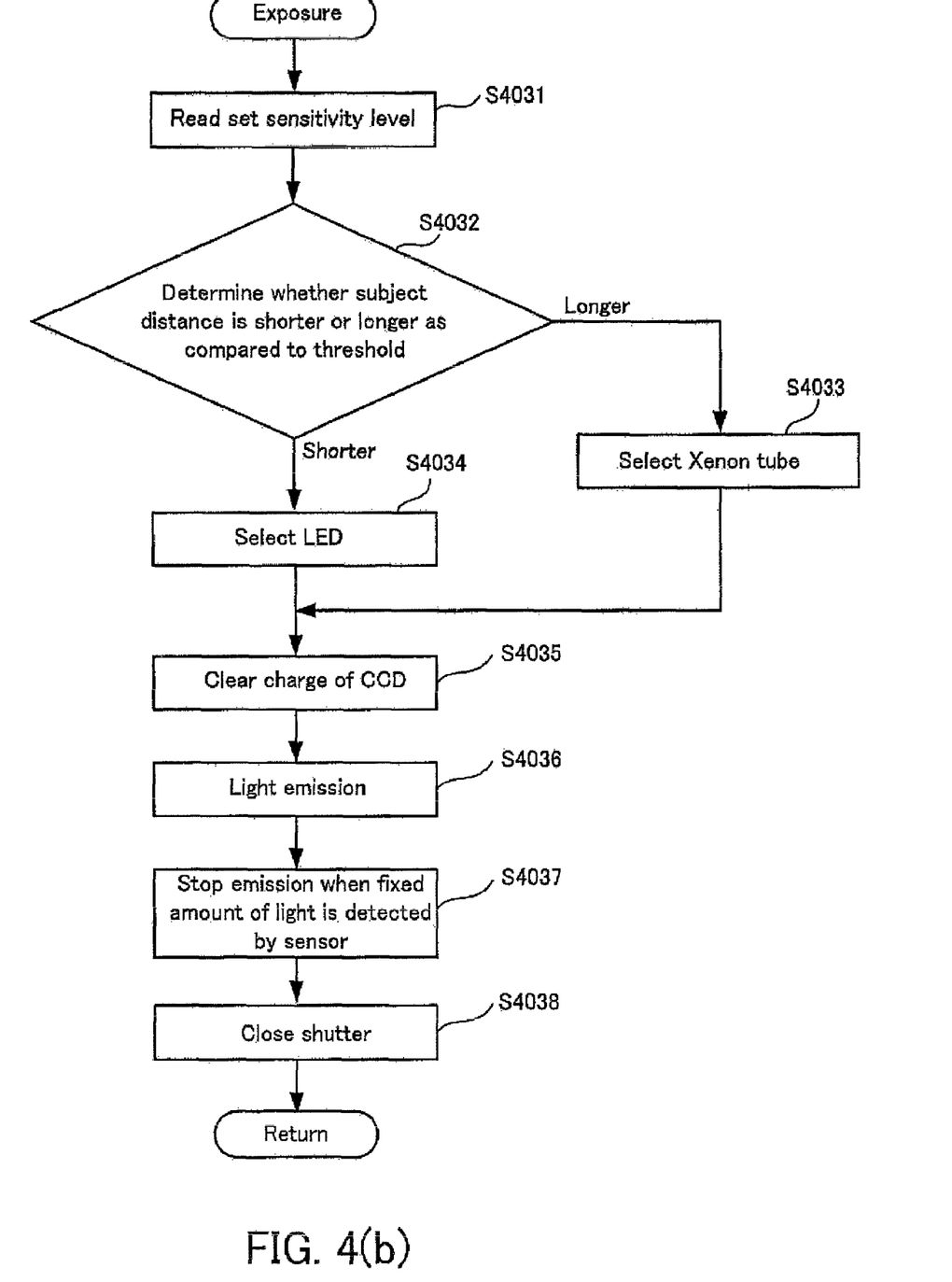

FIG. 4(*a*) is a flowchart showing a shooting processing procedure performed by the main CPU 110 and the metering/distance-measuring CPU 120 in cooperation with each other, which form an example of the emission control section according to the invention. FIG. 4(*b*) is a flowchart showing the details of exposure processing performed at step S403 shown in FIG. 4(*a*).

In response to a half press of the release button 102, the main CPU 110 and the metering/distance-measuring CPU 120 start the processing shown in FIG. 4(*a*).

AE processing (processing for adjusting exposure by controlling the aperture and the like according to the result of metering) is performed at step S401 and subsequently, AF processing (processing for placing the focus lens at a focus position) is performed at step S402.

Subsequently, at step S403, in response to a full press of the release button 102, the mechanical shutter 1113 is opened to start exposure. After a predetermined lapse of time, the mechanical shutter 1113 is closed to stop exposure. At step S403, when the level of field brightness measured at step S402 is equal to or lower than a predetermined level, either the first light emitter 18 or the second light emitter 16 is selected according to the subject distance and the sensitivity level, and fill light is emitted from the selected light emitter. Light emission executed at step S403 will be described more in detail with reference to FIG. 4(*b*) showing the details of the exposure processing at step S403.

When shooting with correct exposure is completed irrespective of the presence or absence of light emission for shooting, the flow proceeds to step S404 where the CG 1121 is instructed to supply a read-out signal to the CCD 112, thereby causing the CCD 112 to output image signals.

Subsequently at step S405, the CG 1121 is instructed to supply a timing signal to the A/D section 114, so that the A/D section 114 performs analog-digital conversion in synchronization with the timing signal. Subsequently, at step S406, the digital image signals thus obtained are supplied, via the buffer memory 115 and the bus 121, to the YC processing section 116 that in turn starts signal processing. Upon completion of the signal processing at the YC processing section 116, the image signals are supplied to the compression/decompression section 117 at step S407, so that the compression/decompression section 117 compresses the image signals. Subsequently, the compressed signals are recorded into the memory card 119 at step S408, and the flow ends.

Now, the details of the exposure processing at step S403 will be described with reference to FIG. 4(*b*).

When the level of field brightness equal to or lower than the predetermined level is detected by the main CPU 110 and the metering/distance-measuring CPU 120 at step S402 shown in FIG. 4(*a*), the flow proceeds to step S4031 where it is checked at which level the sensitivity is set through user operation.

Subsequently, the flow proceeds to step S4032 where it is determined whether or not the subject distance measured by the AF processing at step S402 shown in FIG. 4(*a*) is shorter or longer as compared to the threshold that becomes longer as the sensitivity becomes higher. As described above, the threshold is 1 m when the sensitivity is ISO800 and 2 m when the sensitivity is ISO1600. In this example, when the sensitivity is ISO400 or lower, the threshold is zero and light is emitted from the xenon tube Xe.

When it is determined that the subject distance is longer as compared to the threshold at step S4032, the flow proceeds to step S4033 where the first light emitter 18 having the xenon tube Xe is selected. Meanwhile, when it is determined that the subject distance is shorter as compared to the threshold at step S4032, the flow proceeds to step S4034 where the second light emitter 16 having the LED 160a is selected.

Subsequently, at step S4035, a discharge signal is supplied to the CCD 112 so that unnecessary charge accumulated in the CCD 112 is released, and the mechanical shutter 1113 is opened so that exposure begins. Then, the flow proceeds to step S4036 where fill light for shooting is emitted from the light emitter selected at step S4032.

At the next step S4037, the amount of light per unit time is detected by the sensor TS and integrated by the received-light integration section Int. Upon detection of the amount of emitted light reaching a predetermined amount, light emission is stopped. Subsequently, at step S4038, the mechanical shutter 1113 is closed and the flow proceeds to step S404 shown in FIG. 4(*a*).

When the processing in the above flow is executed by the main CPU 110 and the metering/distance-measuring CPU 120 forming an example of the emission control section according to the invention, either the LED 160a or the xenon tube Xe, whichever is appropriate, is used not only based on the subject distance as in a conventional manner, but also based on the sensitivity for shooting. Accordingly, it is possible to prevent image signals output by multiple light-receiving elements of the CCD from reaching a level of saturation during signal processing.

As described above, according to the present embodiment, there is realized an image-taking apparatus capable of allowing the sensitivity level to be freely set and emitting an appropriate amount of fill light according to the set sensitivity level.

Now, a second embodiment according to the invention will be described.

A digital camera according to the second embodiment has its external appearance similar to that of the digital camera 100 shown in FIGS. 1(*a*) and 1(*b*) and also has an internal configuration approximately similar to that shown in FIG. 2.

Figure 5:
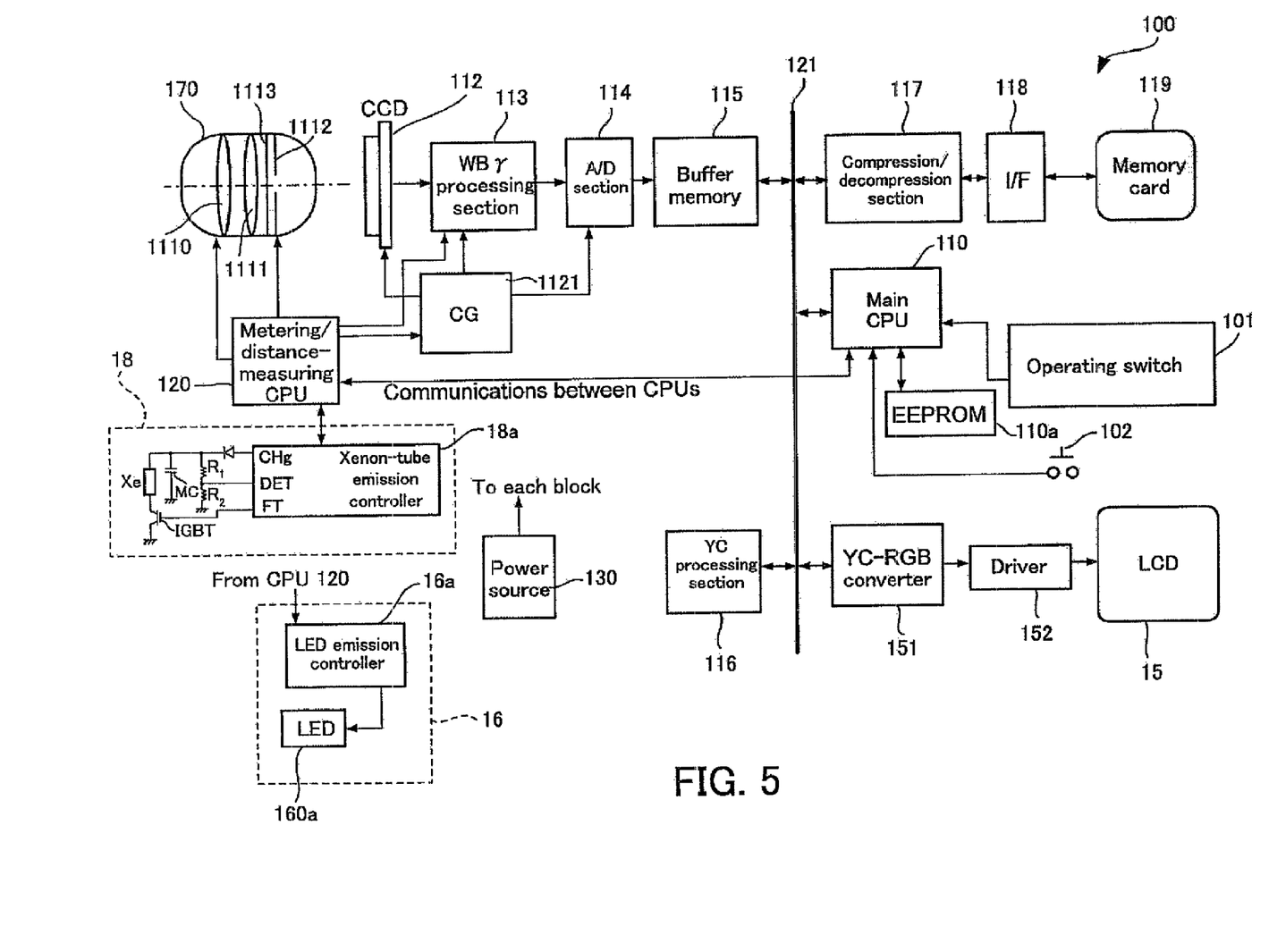
FIG. 5 is a block diagram illustrating an internal configuration of a digital camera according to a second embodiment of the present invention.

FIG. 5 is a block diagram illustrating the internal configuration of a digital camera 100' according to the second embodiment.

The internal configuration shown in FIG. 5 is the same as that shown in FIG. 2 except that the light-adjustment sensor TS and the received-light integration section Int shown in FIG. 2 are omitted. Instead of detecting the timing for stopping light emission with the sensor TS, the digital camera 100' stops light emission for shooting in the following manner. The digital camera 100' first releases a pre-emission, calculates the amount of reflected light to be obtained at a main emission, and then releases the main emission. Subsequently, the digital camera 100' stops the main emission when the amount of reflected light of the main emission reaches the calculated amount of reflected light.

In the digital camera 100', light is selectively emitted from either a xenon tube Xe or an LED 160*a* and thus, if uniform white-balance adjustment is performed in either case by a WB γ processing section 113, unnatural color images may be obtained. For this reason, the digital camera 100' is configured such that in response to an instruction from a main CPU 110, a metering/distance-measuring CPU 120 sets, in the WB γ processing section 113, a white balance according to an emission spectrum of the xenon tube Xe when fill light is emitted from the xenon tube Xe and a white balance according to an emission spectrum of the LED 160*a* when fill light is emitted from the LED 160*a*.

Now, the difference between the LED 160*a* and the xenon tube Xe will be described with reference to FIG. 6.

Figure 6A:
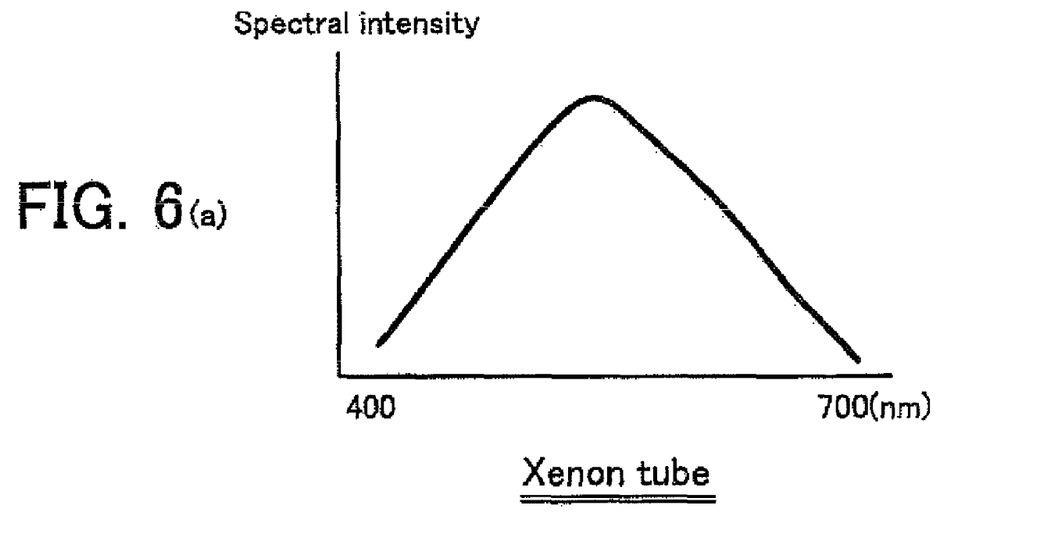
FIGS. 6(a) and 6(b) illustrate emission spectrums of a xenon tube and an LED according to the second embodiment.
Figure 6B:
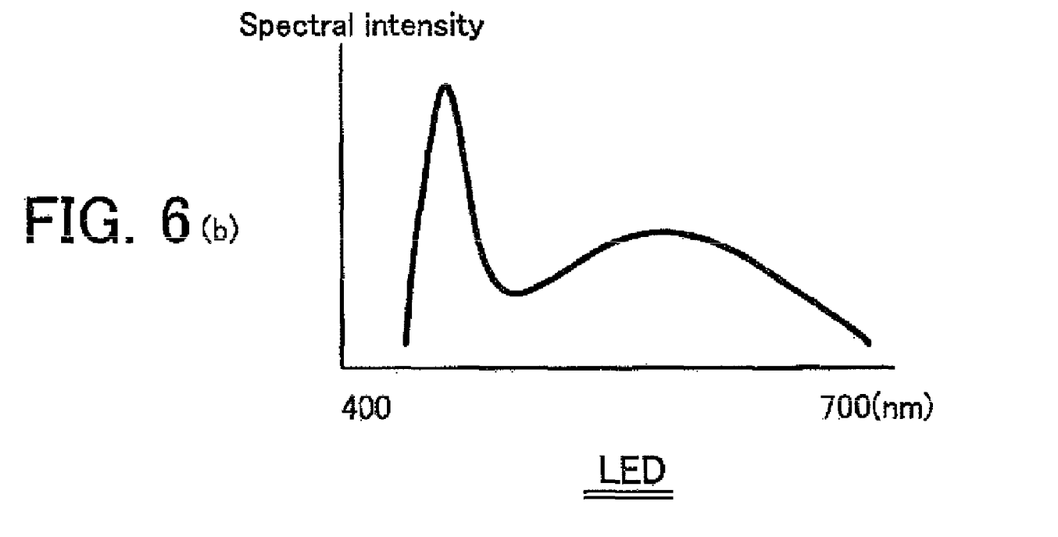

FIGS. 6(*a*) and 6(*b*) illustrate emission spectrums of the xenon tube Xe and the LED 160*a*.

FIG. 6(*a*) shows an emission spectrum of the xenon tube Xe, and FIG. 6(*b*) shows that of the LED 160*a*. The horizontal axis of FIG. 6(*a*) shows "wavelength," whereas the vertical axis shows "spectral intensity" of the xenon tube Xe. Similarly, the horizontal axis of FIG. 6(*b*) shows "wavelength," whereas the vertical axis shows "spectral intensity" of the LED 160*a*. The LED 160*a* whose emission spectrum is shown in FIG. 6(*b*) is an LED that emits blue light.

As shown in FIG. 6(*a*), the xenon tube Xe has a spectral intensity having a hill-like curve formed between blue color and red color in a wavelength range of visible light.

In contrast, the LED 160*a* shown in FIG. 6(*b*) has a spectral intensity having a peak in a wavelength range near blue light.

Therefore, if a white balance is adjusted by the WB γ processing section 113 for light emitted from the xenon tube Xe and that emitted from the LED 160*a* in the same manner, there is obtained an image with unnatural colors. Accordingly, in the present embodiment, based on an instruction from the main CPU 110, the metering/distance-measuring CPU 120 causes the WB γ processing section 113 to perform a white-balance adjustment using a white balance suitable for an emission spectrum of the one selected from the xenon tube Xe and the LED 160*a*, thereby preventing colors in an image from being unnatural.

Figure 7:
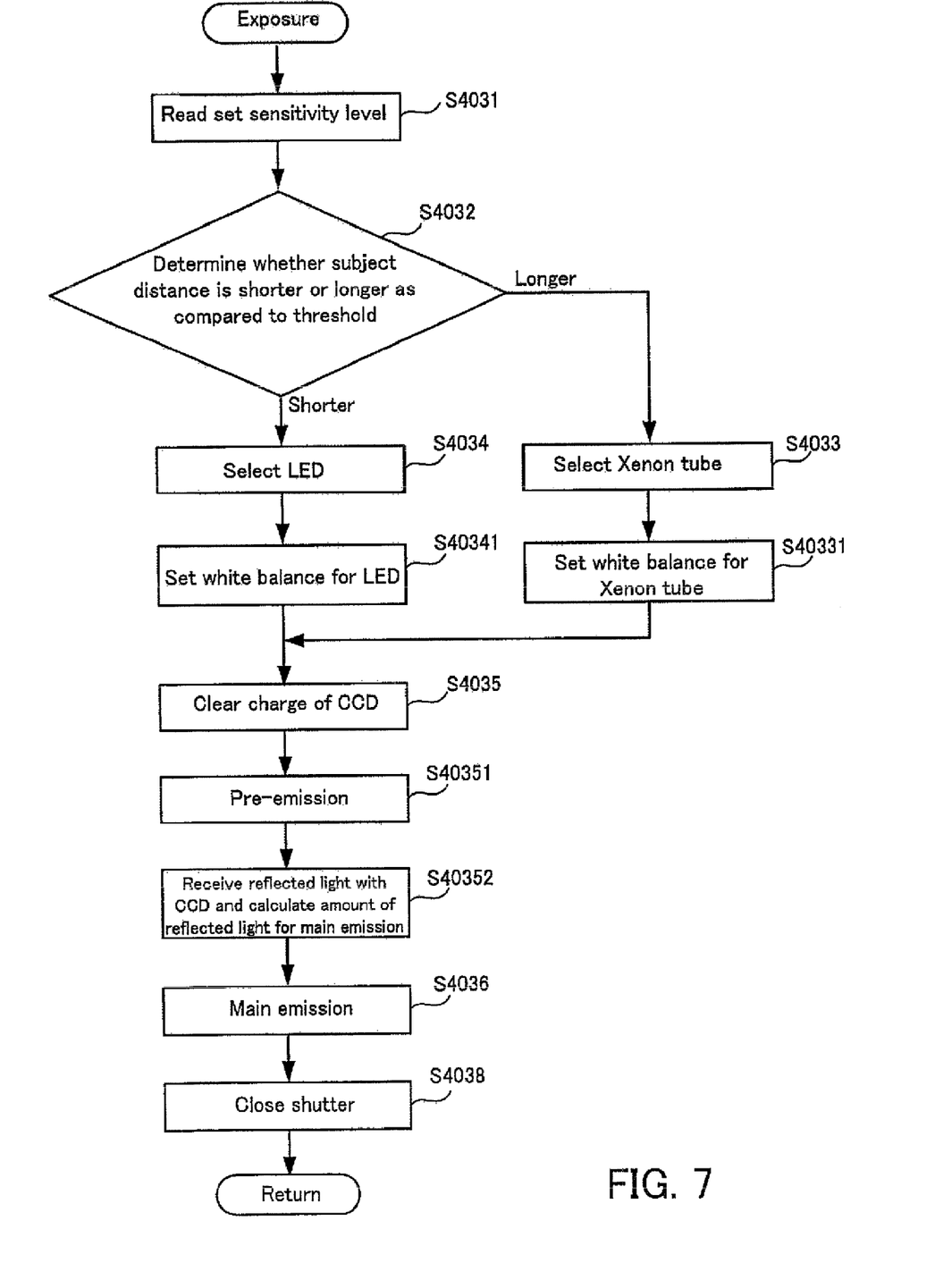
FIG. 7 is a flowchart showing a shooting processing procedure when fill light is used for shooting, according to the second embodiment.

FIG. 7 is a flowchart showing a shooting processing procedure when fill light is used in shooting, according to the second embodiment.

The processing shown in FIG. 7 is the same as that shown in FIG. 4(*b*) except that steps S40331, S40341, S40351, and S40352 are added, while step S7037 is omitted.

In the processing shown in FIG. 7, after either of the two light emitters is selected at step S4033 or step S4034, the WB γ processing section 113 is caused to perform white-balance processing based on a white balance suitable for the xenon tube Xe selected at step S40331 or the LED 160*a* selected at step S40341.

Also, instead of using the timing for stopping light emission set by means of the light-adjustment sensor TS, light emission is stopped such that a pre-emission is released at step S40351, the amount of reflected light to be obtained at the time of a main emission is calculated at step S40352, the main emission is released at step S4036, and the main emission is stopped when the amount of reflected light reaches the calculated amount of light at step S4038.

In this way, according to the second embodiment, an amount of reflected light to be obtained at a main emission is calculated based on a pre-emission so as to precisely control the duration of the main emission, which produces an effect similar to that in the first embodiment in which the amount of light is controlled by means of the light-adjustment sensor TS.

In addition, since white-balance processing suitable for the xenon tube Xe is performed when light is emitted from the xenon tube Xe and that suitable for the LED 160*a* is performed when light is emitted from the LED 160*a*, there is obtained an image where colors of a subject are precisely reproduced.

In the digital cameras according to the first and second embodiments, the light emitters 18 and 16 have the xenon tube Xe and the LED 160*a* respectively, and the metering/distance-measuring CPU 120 causes either the xenon tube Xe or the LED 160*a* to emit light for shooting in response to an instruction from the main CPU 110. Therefore, it is very likely that a photographer using the camera wants to know the source of the emitted light after looking at a shot image.

For example, assume that a photographer has taken a self-portrait with high sensitivity of ISO800 or higher and liked the image obtained by the shooting because the glare of fill light was not so bright that the photographer could keep a good facial expression during shooting more easily than usual.

In this case, naturally, he/she is very likely to desire the same light source as used in this shooting to be used again for taking a self-portrait next time.

In view of such a situation, it is convenient if a digital camera is so configured as to notify the photographer of the type of the light source used in shooting after the shooting is carried out.

A digital camera according to a third embodiment of the invention has such a configuration, which is otherwise the same as the first embodiment and thus, only a feature related to notification of the type of light source will be described below.

Figure 8:
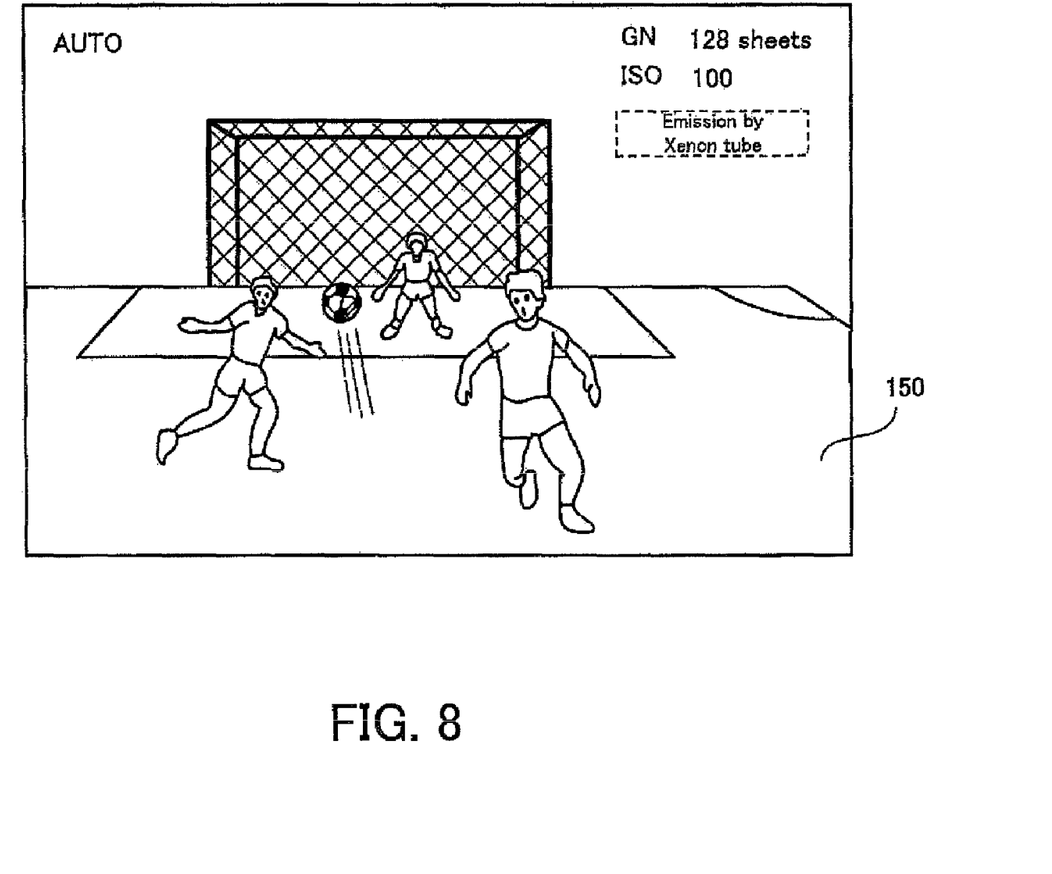
FIG. 8 is a diagram showing a third embodiment.

FIG. 8 is a diagram showing how the type of a light source that has just been used is notified according to the third embodiment.

FIG. 8 shows a screen where a shot image is displayed together with the type of a light source selected by a main CPU 110 and a metering/distance-measuring CPU 120 which form an example of the emission control section according to the invention, after shooting is carried out.

Specifically, as shown in FIG. 8, sensitivity setting (ISO100) and a xenon tube Xe used at the time of shooting are displayed on the screen.

Shooting a self-portrait with a digital camera often takes place indoors and thus, a photographer usually sets high sensitivity in this type of shooting.

As in the first embodiment, fill light is automatically emitted from an LED 160a at the time of shooting.

If the glare of the fill light did not bother the photographer, it is very likely that he/she desires to use the LED 160a again when taking a self-portrait thereafter.

Then, as a matter of course, the photographer is also very likely to set the high sensitivity as he/she previously did, when taking a self-portrait again.

If the digital cameras of the first through the third embodiments are configured to have a selector for selecting a light source in accordance with user operation, the user can select, before carrying out the next shooting, either the xenon tube or the LED to be used by operating the selector, based on the type of a light source that has just been used and displayed on the screen. The configuration including the selector can be readily implemented by merely adding a selector switch.

In order to achieve a similar effect, the digital camera may be configured such that either the xenon tube Xe or the LED 160a used in shooting is recorded in a memory card 119 in association with image signals obtained by the shooting, at the time when the image signals are recorded in the memory card 119.

When the digital camera is thus configured, a photographer can be aware of which type of light source has been used in shooting, when an image based on the image signals obtained by the shooting and recorded in the memory card 119 is reproduced on the screen of the digital camera or a personal computer.

A digital camera according to a fourth embodiment of the invention is configured such that the type of a light source is recorded in a memory card 119. The fourth embodiment is otherwise the same as the first embodiment and thus, only a feature related to recording of the type of a light source will be described below.

Figure 9:
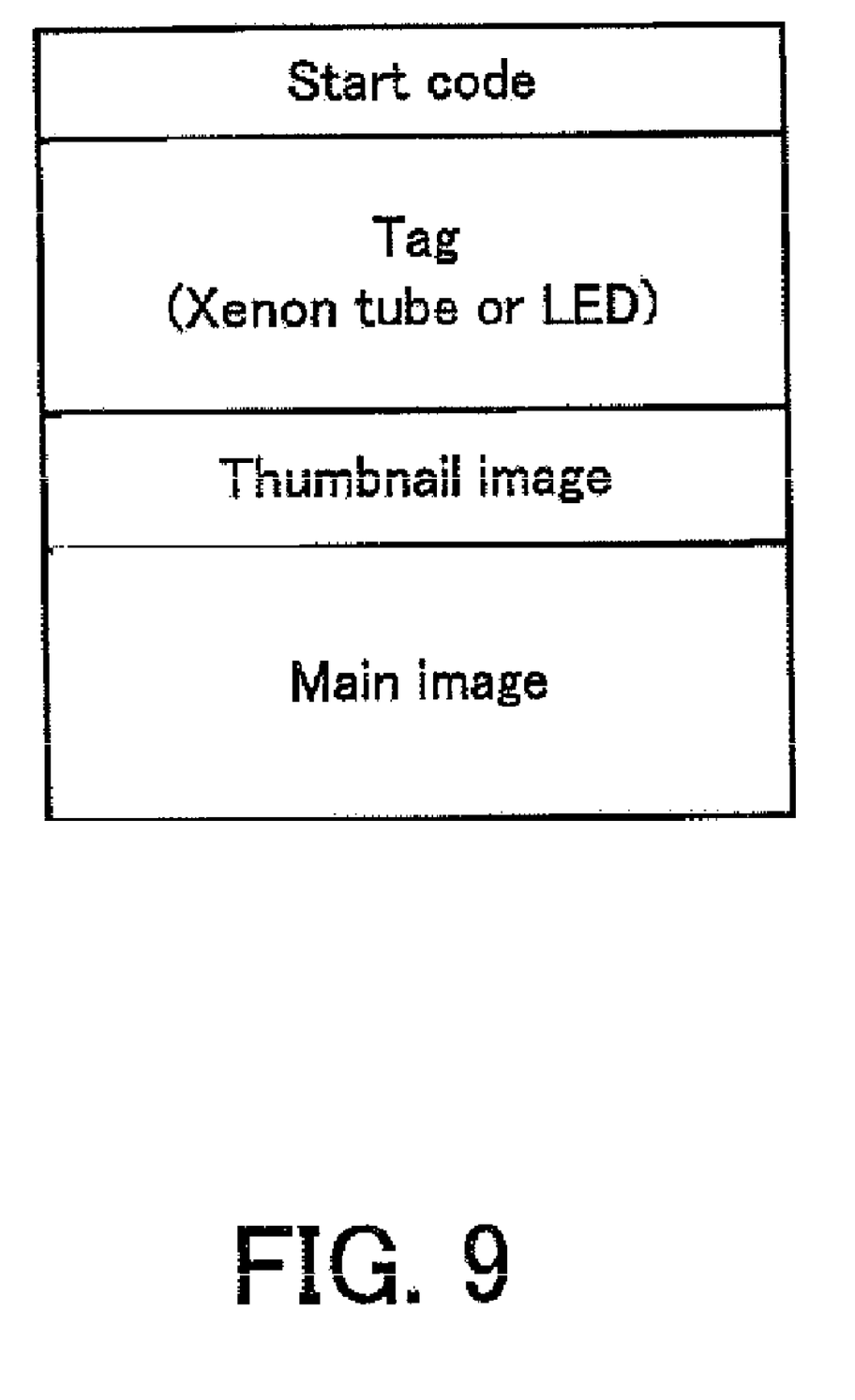
FIG. 9 is a diagram showing a fourth embodiment.

FIG. 9 is a diagram for describing the fourth embodiment. FIG. 9 shows memory allocation in the memory card 119, which is employed to record an Exif file including image signals via an I/F 118 by a compression/decompression section 117 of the digital camera. As shown in FIG. 9, from the top, a start code area, a tag area, a thumbnail-image area and a main-image area are provided in this order in the Exif file.

According to the fourth embodiment, when executing recording processing at step S408 shown in FIG. 4(a), a main CPU 110 causes the memory card 119 to record image data obtained by shooting in a form of image file (Exif file), and to record the type of a light source used in the shooting in the tag area shown in FIG. 9 in association with the image data.

In the digital camera thus configured, for example, when a shooting mode is switched to a playback mode by a mode lever of the digital camera, the main CPU 110 displays the type of a light source used in shooting together with a shot image obtained by the shooing on an LCD panel 150 of an LCD 15 (see FIG. 8).

According to the forth embodiment, it is possible for a photographer to know what type of light source has been used to emit fill light for shooting when a shot image obtained by the shooting is reproduced. Accordingly, an effect similar to that described above with reference to FIG. 8 can be obtained when subsequent shooting is carried out after the previously image shot is thus reproduced.

What is claimed is:

1. An image-taking apparatus that includes an imaging device and an image-taking optical system and generates image signals by forming an image of a subject on the imaging device through the image-taking optical system, comprising:
   a light emitting section including a first light emitter that emits a relatively large amount of light for shooting and a second light emitter that emits a relatively small amount of light for shooting;
   a metering section that meters brightness of field;
   a sensitivity setting section that sets a sensitivity level;
   a distance measuring section that measures a subject distance;
   a detection section that detects that the brightness metered by the metering section is equal to or lower than a predetermined level;
   an emission control section that, in a case where the detection section detects that the brightness metered by the metering section is equal to or lower than the predetermined level,
   (a) causes the first light emitter to emit light when the subject distance measured by the distance measuring section is longer as compared to a threshold, and
   (b) causes the second light emitter to emit light when the subject distance measured by the distance measuring section is shorter as compared to the threshold,
   wherein the threshold is determined uniquely according to the sensitivity level being set when the detection section detects that the brightness metered by the metering section is equal to or lower than the predetermined level and is variable such that the higher the sensitivity level being set when the detection section detects that the brightness metered by the metering section is equal to or lower than the predetermined level is, the longer the threshold is; and
   an image signal generating section that, under the sensitivity level being set when the detection section detects that the brightness metered by the metering section is equal to or lower than the predetermined level, generates image signals which represent an image of the subject formed on the imaging device by using the light emitted by the control of the emission control section.

2. The image-taking apparatus according to claim 1, wherein the emission control section comprises:
   a sensor that measures an amount of light reflected from the subject, the reflected light originating from the light emitted from the light emitting section to the subject; and
   a light-emission terminator that terminates emission of the light emitted from the light emitting section based on the amount of light measured by the sensor.

3. The image-taking apparatus according to claim 1, wherein the emission control section causes the light emitting section to release a pre-emission, and
   the emission control section comprises:
   a calculator that calculates an amount of light to be emitted as a main emission, based on image signals obtained by the imaging device at the pre-emission; and
   a light adjuster that adjusts light by adjusting a duration of the main emission performed by the light emitting section based on the amount of light calculated by the calculator.

4. The image-taking apparatus according to claim 1, further comprising a white-balance adjustment section that adjusts a white balance of image signals obtained by the imaging device, such that the white-balance adjustment section makes a white-balance adjustment differently to image signals obtained by shooting with light, depending on which of the first light emitter and the second light emitter the light has been emitted from.

5. The image-taking apparatus according to claim 1, wherein the first light emitter comprises a xenon tube and the second light emitter comprises an LED.

6. The image-taking apparatus according to claim 1, further comprising a notification section that notifies a user of which one of the first light emitter and the second light emitter has been used in shooting.

7. The image-taking apparatus according to claim 6, further comprising a display section having a display screen, wherein the notification section notifies a user of a light emitter that has been used in shooting by displaying the light emitter on the display screen of the display section.

8. The image-taking apparatus according to claim 1, further comprising a recording section that records which one of the first light emitter and the second light emitter has been used in shooting, in association with image signals obtained by the shooting.

9. The image-taking apparatus according to claim 1, wherein the metering section performs metering based on image signals obtained by the imaging device.

10. The image-taking apparatus according to claim 1, wherein the distance measuring section performs measurement based on image signals obtained by the imaging device.

11. The image-taking apparatus according to claim 1, wherein the sensitivity level being set when the detection section detects that the brightness metered by the metering section is equal to or lower than the predetermined level is represented in terms of ISO sensitivity, and the threshold is variable such that the threshold is doubled if the sensitivity level being set when the detection section detects that the brightness metered by the metering section is equal to or lower than the predetermined level is doubled.

\* \* \* \* \*